United States Patent
Rom

(10) Patent No.: US 8,109,074 B2
(45) Date of Patent: Feb. 7, 2012

(54) GAS TURBINE ENGINE SYSTEM

(75) Inventor: Haim Rom, Givataim (IL)

(73) Assignee: Newton Propuslion Technologies, Tel Aviv (IL)

( * ) Notice: Subject to any disclaimer, the term of this patent is extended or adjusted under 35 U.S.C. 154(b) by 1419 days.

(21) Appl. No.: 10/507,544

(22) PCT Filed: Mar. 10, 2003

(86) PCT No.: PCT/IL03/00192
§ 371 (c)(1),
(2), (4) Date: Jan. 11, 2006

(87) PCT Pub. No.: WO03/076779
PCT Pub. Date: Sep. 18, 2003

(65) Prior Publication Data
US 2006/0101800 A1   May 18, 2006

Related U.S. Application Data

(60) Provisional application No. 60/363,842, filed on Mar. 14, 2002.

(51) Int. Cl.
*F02G 1/00* (2006.01)
*F02G 3/00* (2006.01)
*F02B 53/00* (2006.01)

(52) U.S. Cl. .......................... 60/39.6; 123/249

(58) Field of Classification Search ............ 60/39.6, 60/39.17, 761, 225; 123/249, 222, 232, 562, 123/563; 418/196, 191
See application file for complete search history.

(56) References Cited

U.S. PATENT DOCUMENTS

| | | | |
|---|---|---|---|
| 2,531,761 A * | 11/1950 | Zucrow | 60/225 |
| 3,088,276 A * | 5/1963 | Hudson | 60/39.6 |
| 3,214,907 A | 11/1965 | Martin | |
| 3,490,229 A | 1/1970 | Klein | |
| 3,640,252 A | 2/1972 | Spinnett | |
| 3,843,284 A | 10/1974 | Spinnett | |
| 3,862,622 A | 1/1975 | Spinnett | |
| 3,863,610 A | 2/1975 | Spinnett | |
| 3,869,863 A * | 3/1975 | Juge | 60/39.19 |
| 3,918,857 A | 11/1975 | Fitzgerald | |
| 4,502,283 A * | 3/1985 | Wandel | 60/609 |
| 4,545,198 A | 10/1985 | Yoshida | |
| 4,620,514 A | 11/1986 | Tseng | |
| 4,719,750 A * | 1/1988 | Lemmin | 60/226.1 |
| 4,753,076 A * | 6/1988 | Deutschmann et al. | 60/612 |
| 4,813,388 A | 3/1989 | Yang | |
| 4,825,827 A * | 5/1989 | Yang | 123/249 |
| 5,056,314 A * | 10/1991 | Paul et al. | 60/609 |
| 5,165,238 A | 11/1992 | Paul et al. | |
| 5,168,846 A * | 12/1992 | Paul et al. | 123/202 |
| 5,212,942 A | 5/1993 | Malohn | |

(Continued)

FOREIGN PATENT DOCUMENTS

CA    1006442    3/1977

(Continued)

*Primary Examiner* — Ehud Gartenberg
*Assistant Examiner* — Gerald Sung
(74) *Attorney, Agent, or Firm* — Fogg & Powers LLC

(57) ABSTRACT

An engine system comprises at least a first volumetric device, and a second volumetric device in which said second volumetric device is larger in volume than said first volumetric device, in which, during continuous flow of a compressible fluid from said first to said second volumetric device work is performed.

22 Claims, 17 Drawing Sheets

U.S. PATENT DOCUMENTS

| | | | |
|---|---|---|---|
| 5,362,219 A * | 11/1994 | Paul et al. | 418/61.2 |
| 5,471,834 A | 12/1995 | Kapich | |
| 5,692,372 A | 12/1997 | Whurr | |
| 6,000,214 A | 12/1999 | Scragg | |
| 6,397,579 B1 * | 6/2002 | Negre | 60/39.6 |
| 6,526,937 B1 | 3/2003 | Bolonkin | |
| 6,530,211 B2 | 3/2003 | Holtzapple et al. | |
| 7,621,116 B2 * | 11/2009 | Rom et al. | 60/225 |
| 2002/0004007 A1 | 1/2002 | Doring et al. | |

FOREIGN PATENT DOCUMENTS

| | | |
|---|---|---|
| DE | 42 41 403 | 7/1993 |
| DE | 4241403 | 7/1993 |
| EP | 0803639 | 10/1997 |
| FR | 2777943 | 10/1999 |
| GB | 647089 | 12/1950 |
| JP | 46039884 | 11/1971 |
| JP | 57165631 | 10/1982 |
| JP | 62034937 | 2/1987 |
| JP | 63032129 | 2/1988 |
| JP | 63255530 | 10/1988 |
| JP | 63268938 | 11/1988 |
| JP | 04320718 | 11/1992 |
| JP | 06010703 | 1/1994 |
| JP | 08189420 | 7/1996 |
| JP | 2000352321 | 12/2000 |
| JP | 2001165561 | 6/2001 |
| JP | 2001193476 | 7/2001 |
| JP | 2001221001 | 8/2001 |
| WO | WO-83/01276 | 4/1983 |
| WO | WO 83/01276 | 4/1983 |
| WO | 9956013 | 11/1999 |
| WO | 0006876 | 2/2000 |
| WO | WO 00/06876 | 2/2000 |
| WO | WO-00/06876 | 2/2000 |
| WO | 03067030 | 8/2003 |
| WO | 03076779 | 9/2003 |

* cited by examiner

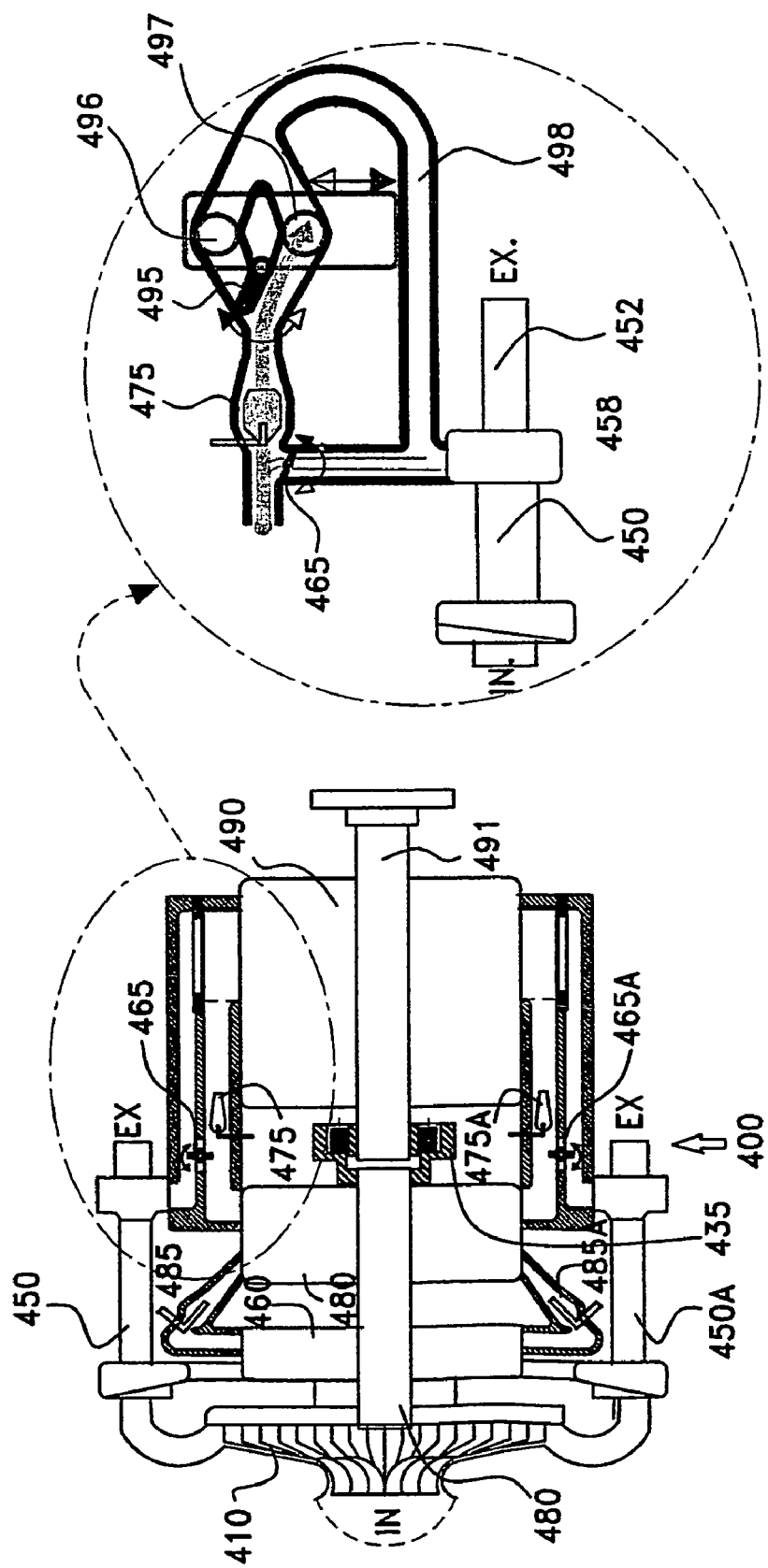

GAS TURBINE ENGINE SYSTEM

This application claims priority to International Patent Application No. PCT/IL03/00192 filed on Mar. 10, 2003, which claims priority to U.S. Provisional Patent Application No. 60/363,842 filed on Mar. 14, 2002.

FIELD OF THE INVENTION

The present invention relates to the field of thermal engine systems, particularly gas turbines. More particularly the invention relates to a gas turbine in which a controlled volume of fluid undergoes a continuous-flow positive displacement cycle.

BACKGROUND OF THE INVENTION

The vast majority of world-wide prime mover capacity is in the form of internal combustion engines. These include engines in automobiles, trucks, tractors, ships, airplanes, and stationary plants. Thermodynamically, engines are classified according to their basic cycle. With respect to reciprocating and other types of volumetric internal combustion engines.

A volumetric internal combustion engine possesses an advantage over a conventional gas turbine engine in that it operates by means of static pressure within a closed volume which enables effective and efficient operation with low dependence on engine velocity and therefore relatively high efficiency and output through a wide range of engine velocity. Also its parts can generally work at temperatures much less than the maximum cyclic temperature. As a result, said maximum cyclic temperature may be high, thereby allowing for a high cyclic efficiency. Other advantages associated with the volumetric internal combustion engine include its relatively low cost, high mechanical efficiency and wide variation in speed and load. These advantages are of particular importance in the field of land transportation.

A typical single-shaft open-type gas turbine engine designated by numeral 10 is illustrated in FIG. 1. Gas turbine engine 10 comprises compressor 2, combustor 5 and turbine 7, which is coupled to the compressor by shaft 8. Atmospheric air 3 enters compressor 2, in which its pressure and temperature is increased. The compressed air is then forced into combustor 5, in which it mixes and burns with a fuel. Hot pressurized combustion gases 9 expand within turbine 7 and achieve a higher velocity, causing shaft 8 to rotate, thereby driving compressor 2 and any load connected to the shaft, due to the kinetic energy of the combustion gas stream. Combustion gases 9 are then discharged to the atmosphere. The net work of the cycle is the difference between the work obtainable in the expansion process and the work of compression.

Relative to a volumetric engine, a gas turbine engine has a greater power to weight ratio, and therefore its size is smaller than its volumetric engine counterpart at a given power output. A gas turbine engine is capable of rapid start-up and loading, and is likely to have a long life. Also, an open-type gas turbine engine offers the advantage of simple sealing systems. No effective cooling is possible.

A gas turbine engine has good efficiency at full load when the operation temperature and kinetic energy of the combustion gases, compressor pressure ratio, and rotational velocity of the shaft are high. However, the efficiency is reduced when the load is lowered, such as by lowering the operation temperature or the rotational velocity of the shaft. Consequently, prior art gas turbine engines have been usually found to be suitable for those applications requiring substantially constant rotational velocity and output, such as transcontinental aircraft or power plants, but heretofore have been found not to be suitable for uses such as land transportation or light aircraft, which require wide variations in speed and load.

It is an object of the present invention to provide a combustion engine system, particularly a gas turbine engine, that allows for a wide variation in speed and load.

It is an additional object of the present invention to provide a gas turbine engine that is suitable for use in land transportation.

It is an additional advantage of the present invention to provide a combustion engine system that can efficiently burn a broad range of fuels.

It is another object of the present invention to provide a combustion engine system that is cost effective.

It is a further object of the present invention to provide a gas turbine engine that overcomes the disadvantages of the prior art devices while retaining their inherent advantages.

It is a still further object of the present invention to combine the advantages of volumetric systems with those of flow systems.

Other objects and advantages of the invention will become apparent as the description proceeds.

SUMMARY OF THE INVENTION

The present invention provides an improved combustion engine system comprising at least a first and a second volumetric device, through which work is performed during continuous flow of a compressible fluid from said first to said second volumetric device.

According to a preferred embodiment, the engine comprises an additional work producing device, particularly a turbine, driven by the fluid discharged from said second volumetric device.

As referred to herein, a "fluid displacement cycle" is defined as a process by which a fluid is displaced in a succession of stages, which may be repeated as many times as desired, theoretically for an unlimited number of times. If the displacement of the fluid in each stage is determined by the displacement or displacements of a mechanical element or a number of such elements from a first to a second position, the cycle is called a "positive displacement cycle".

As referred to herein, a "volumetric device" is a device that delivers the same volume of fluid that it receives. Generally, such a device uses a positive displacement cycle to transfer the same amount of fluid at each cycle. It should be understood that this need not be and generally is not the sole function of a volumetric device, but rather one of its functions. Typically, the same volume of fluid is received and delivered by the device in each stage. Said volume of fluid will be called hereinafter "controlled volume".

The transfer of a fluid from a first volumetric device to a second volumetric device, wherein fluid is transferred during each stage of the positive displacement cycle of the volumetric devices, is considered herein to be and is called "continuous flow"

A "turbine" is defined herein as a device for outputting work or for turbocharging fluid by transferring kinetic energy of a driving fluid into mechanical energy upon passage thereof across turbine blades. In embodiments of this invention comprising turbines, the driving fluid is the exhaust of the second of two volumetric devices.

In one preferred embodiment, the present invention provides an engine system which comprises:
 a) a first volumetric device;
 b) means for feeding a compressible fluid to said first volumetric transfer unit;

c) a heat source or sources;
d) means for driving said first volumetric transfer unit for sequentially transferring controlled volumes of said fluid to said heat source by positive displacement cycles;
e) a second volumetric device, larger then the first one, for receiving heated controlled volumes of said fluid from said heat source;
f) means for driving said second volumetric device for sequentially discharging said heated controlled volumes of said fluid by positive displacement cycles; and
g) means for synchronizing said means for driving said first and second volumetric device.

In preferred embodiments:
I) the means for synchronizing said means for driving said first and second volumetric device comprise a common shaft supporting said first and second volumetric devices for rotation.
II) the means for feeding a compressible fluid to a first volumetric transfer unit include means for increasing the pressure of said fluid, preferably a compressor;
III) the engine system further comprises a turbine and the discharge of said second volumetric device is the inlet of said turbine;
IV) the heat sources are combustors fed with a fuel, which receive controlled volumes of fluid and cause said fuel to burn, thereby heating said fluid, wherein said fuel may but need not be any fossil-based engine fuel;
V) the compressor, if any, the first and second volumetric device, and the turbine, if any, are keyed to the same main shaft;
VI) the compressible fluid is usually air;
VII) the engine system further comprises an additional work producing device, which is preferably but not necessarily a turbine, which device is driven by the fluid discharged from said second volumetric device and produces work from the kinetic energy of said discharged fluid.

Since said first volumetric device transfers fluid to said second volumetric device, it may be called "transfer volumetric device". Since said second volumetric device receives heated controlled volumes of fluid from the heat source or sources, it may be called "expansion volumetric device". A torque is exerted on said common shaft means or said main shaft of said engine system, due to a static pressure between said transfer and said expansion volumetric device chambers, independent on the torque exerted by the gas turbine or other additional work producing device, if any.

"Energy" denotes herein the net work done by the compressible fluid within the engine system while flowing to the discharge of said second volumetric device.

The positive displacement cycle is effected by means of apparatus selected from the group of rotors provided with lobes, Wankel mechanism, reciprocating piston systems, or any other common or specially designed volumetric system.

In a particular embodiment of the invention, the engine system further comprises at least one stage of intercoolers.

In another embodiment, the engine system comprises two independent shafts to one of which is coupled a load, and preferably a one-way clutch for engaging and disengaging the two independent shafts, depending on a magnitude of the load.

The engine system of the present invention is suitable for operation at a variable load and speed. Therefore the engine system may be incorporated into a motor vehicle propulsion system. In one embodiment, the motor vehicle propulsion system comprises a secondary heater for heating exhaust from the second volumetric device and further comprises a third volumetric device rotating about an independent shaft, wherein the discharge from the secondary heater is the working fluid of said third volumetric device, said third volumetric device being adapted to be a speed and torque converter in response to a variable load coupled to said independent shaft, the engine system further comprising a rotational direction controller of said independent shaft by a valve means which directs said discharge from the secondary heater alternatively between the inlet and outlet ports of said third volumetric device. If necessary, a bypass valve that serves as engage and disengage device between the motor assembly and torque converter assembly is installed so that torque converter can be repressed while the motor is operating.

The motor vehicle propulsion system may further comprise a first stage intercooler for cooling the discharge flowing from a first compressor to a second compressor and a second stage intercooler for cooling the discharge flowing from the second compressor to the turbocompressors of the turbochargers. It may further comprise a third stage intercooler for cooling the discharge flowing from the turbocompressor of the turbocharger to the first volumetric device, and a heat exchanger for heating the fluid flowing from the first volumetric device to the heat source by means of the discharge from the turbine of the turbocharger.

The motor vehicle propulsion system preferably further comprises a transmission comprising:
a) a plurality of coaxial volumetric devices rotatable about the independent shaft;
b) a plurality of conduits through which the discharge from the secondary heater flows in parallel to each of said plurality of volumetric devices, respectively;
c) a plurality of selector valves provided with each of said plurality of volumetric devices, respectively, for changing the directional direction of the independent shaft by directing the flow through a corresponding conduit alternatively between the inlet port and outlet port of the corresponding volumetric device upon actuation of each of said selector valves in unison; and
d) a plurality of bypass valves in communication with each of said conduits, respectively, for selecting through which combination of said plurality of volumetric devices discharge from the secondary heater will flow, wherein said motor vehicle propulsion system produces a maximum amount of torque when the discharge from the secondary burners is directed to all of said plurality of volumetric devices in parallel, a lowered level of torque upon deactivation of at least one of said bypass valves, and an increased level of torque upon activation of at least one more of said deactivated bypass valves.

Preferably the plurality of selector valves are automatically actuated upon input of an operator or speed and torque controller.

In another preferred embodiment, the engine system is a turbofan engine system which further comprises a turbocompressor for compressing atmospheric air and delivering said compressed air to a transfer volumetric device and a turbine driven by discharge from an expansion volumetric device for driving said turbocompressor, wherein the main shaft drives a fan which generates a crossfan streamline and a main thrust for an aircraft, exhaust from said turbine being discharged to the atmosphere and providing auxiliary thrust which is in addition to said main thrust. Alike embodiment can be realized without a turbocompressor by using the fan thrust also for the feeding of the volumetric device.

In another preferred embodiment of the present invention, the engine system is a turbojet engine system, wherein the expansion volumetric device provides auxiliary thrust which is in addition to the main thrust for an aircraft provided by a jet stream generated by a main burner, an air stream from said at least one compressor feeding the inlet volumetric chamber and the main burner. Alike embodiment can use turbo compressor(s) in order to improve efficiency and output.

BRIEF DESCRIPTION OF THE DRAWINGS

In the drawings:

FIGS. 10A and 10B are flow and schematic diagrams, respectively, of an engine system suitable for motor vehicles, while FIG. 10C illustrates the operation of a selector valve and declutching (bypass) valve;

DETAILED DESCRIPTION OF PREFERRED EMBODIMENTS

In one embodiment thereof, the present invention provides a novel gas turbine engine system in which the working fluid imparts a torque upstream to the turbine blades, so that a wide variation in load and shaft speed may be realized without a significant reduction in cyclical efficiency. Prior art gas turbine engines achieve a relatively high cyclical efficiency at full load when the kinetic energy of combustion gases flowing from a combustor to a turbine is at a maximum; however, their efficiency is significantly lowered following a reduction in kinetic energy of the combustion gases and a concomitant reduction in shaft speed. Use of prior art gas turbine engines is therefore precluded for those applications which require a wide variation in speed and load, such as land transportation or light aircraft. In contrast, the engine system of the present invention incorporates a positive displacement cycle by which a transfer volumetric device and an expansion volumetric device in fluid communication with one another by means of conduits and a combustor. A torque, exerted on the main engine shaft, is generated due to difference in size (and volume) between the two volumes and rotors under the same pressure. The energy of the working fluid is therefore utilized for various applications, as will be described hereinafter, which increases the cyclical efficiency of the engine system as well as its flexibility in terms of performing work during changes of speed and load.

Figure 1:
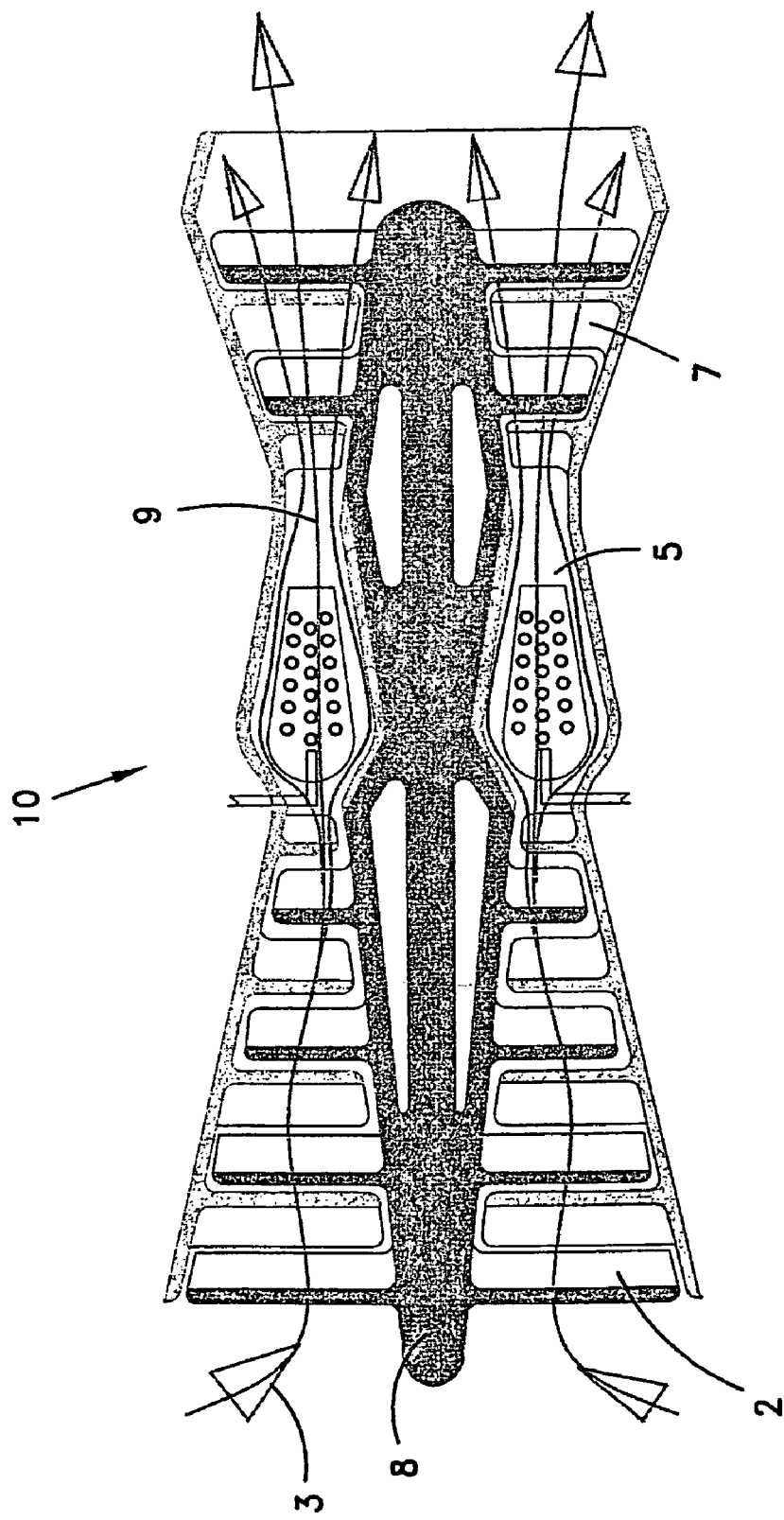
FIG. 1 is a schematic drawing of a prior art gas turbine system.
Figure 2A:
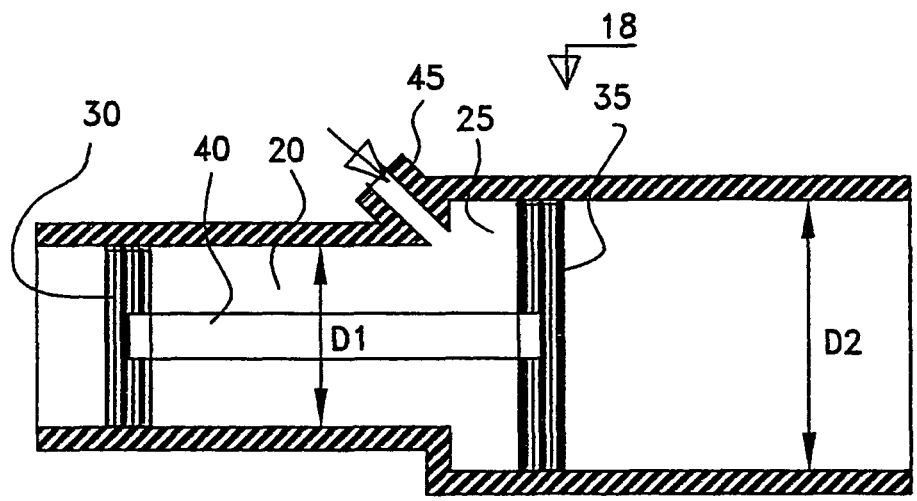
FIG. 2 is a schematic drawing of a volumetric system comprised of two unequally sized chambers.
Figure 2B:
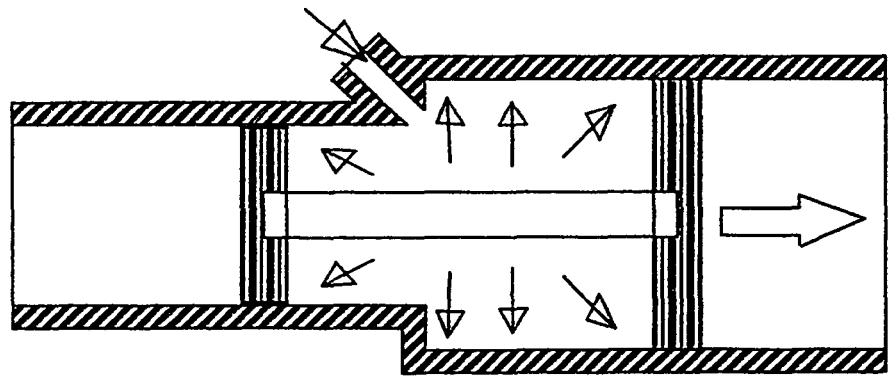
Figure 2C:
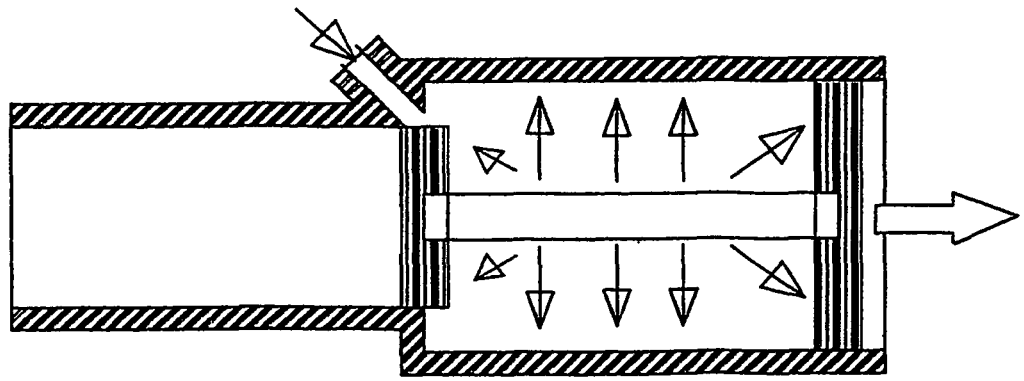

FIGS. 2A to 2C are a schematic illustration of a principle that is applied in the invention. FIG. 2A shows a volumetric system generally indicated as 18, which comprises two interconnected chambers 20 and 25 of unequal volume and of unequal diameters D1 and D2. Pistons 30 and 35 are displaceable within chambers 20 and 25, respectively, and are connected by rod 40 parallel to the longitudinal axis of system 18. The volume between the two pistons comprises two portions, each belonging to one of the two chambers. As the pistons move along the longitudinal axis of the system both portions vary. If a fluid is admitted to the system via inlet 45, a pressure is produced in each of said two chamber portions. Since piston 35 has a larger surface than piston 30, said pressure generates a resultant force (directed to the right as seen in the figures) on the assembly of the two pistons and rod 40, said assembly is displaced in said direction, and work can be obtained from said displacement. As more fluid is admitted through inlet 45, said assembly is additionally displaced, and more work may be obtained from volumetric system 18. FIGS. 2B and 2C show successive stages of said process.

All of the following embodiments are described as comprising two independent flow paths of working fluid. It will be understood that any number of flow paths may be employed with similar results, and two flow paths have been chosen to simplify the description.

Figure 3:
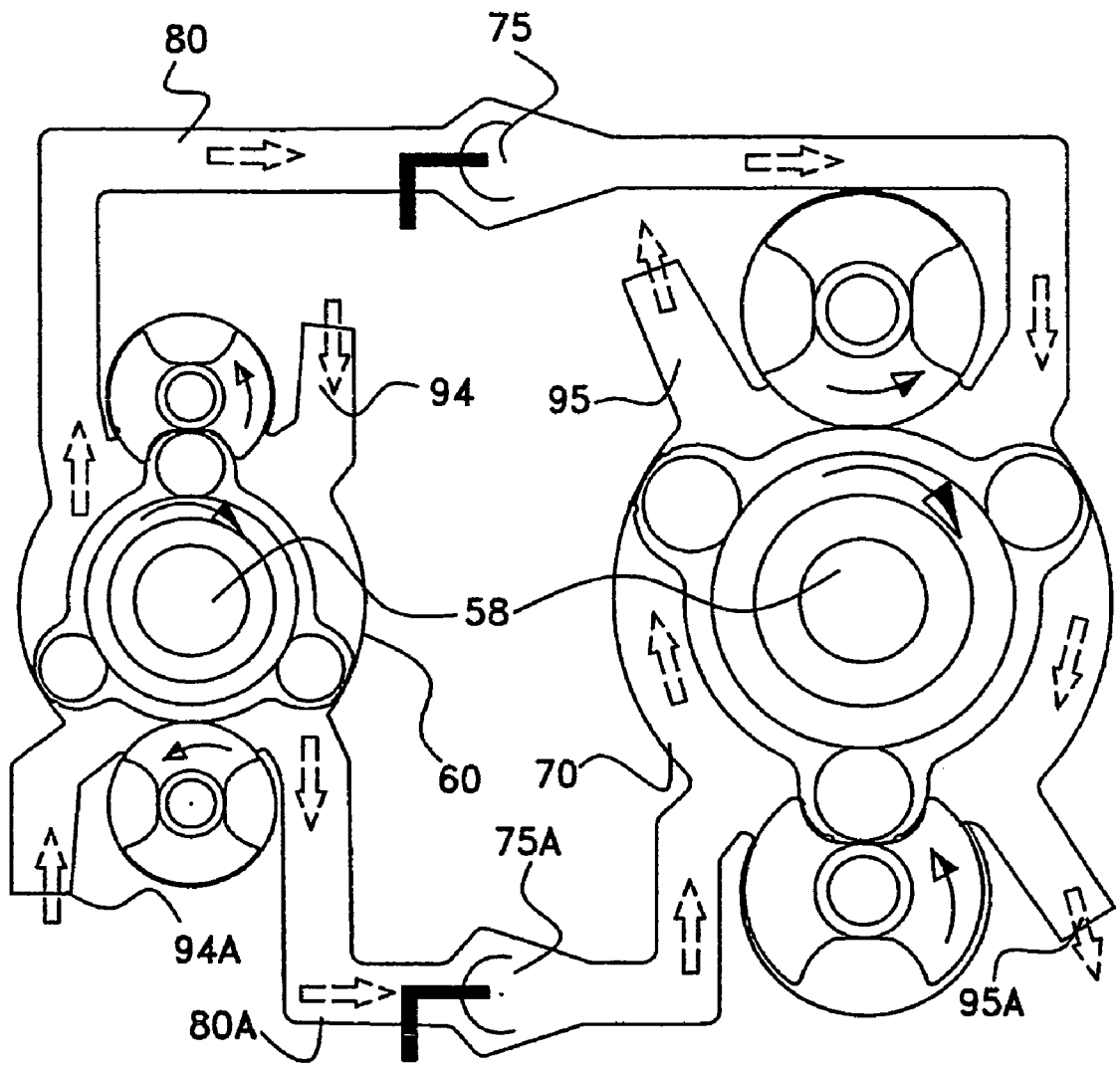
FIG. 3 is a flow diagram of an engine system which does not drive a compressor or a turbine.

FIG. 3 demonstrates the very basic concept of the present invention: a volumetric device consist of at least two volumetric units; transfer unit 60 and expansion unit 70 rotating about a common shaft 58.

Said transfer unit 60 is charged through intake conduits 94 and 94A and then connected to said expansion unit via conduits 80 and 80A and combustors 75 and 75A. At the end of each expansion sector, the burnt mixture is discharged from expansion unit 70 through exhaust conduits 95 and 95A. Most of the forthcoming embodiments of the present invention are based on the above described device (FIG. 3) or alike with different, corresponding peripheral systems.

Figure 4:
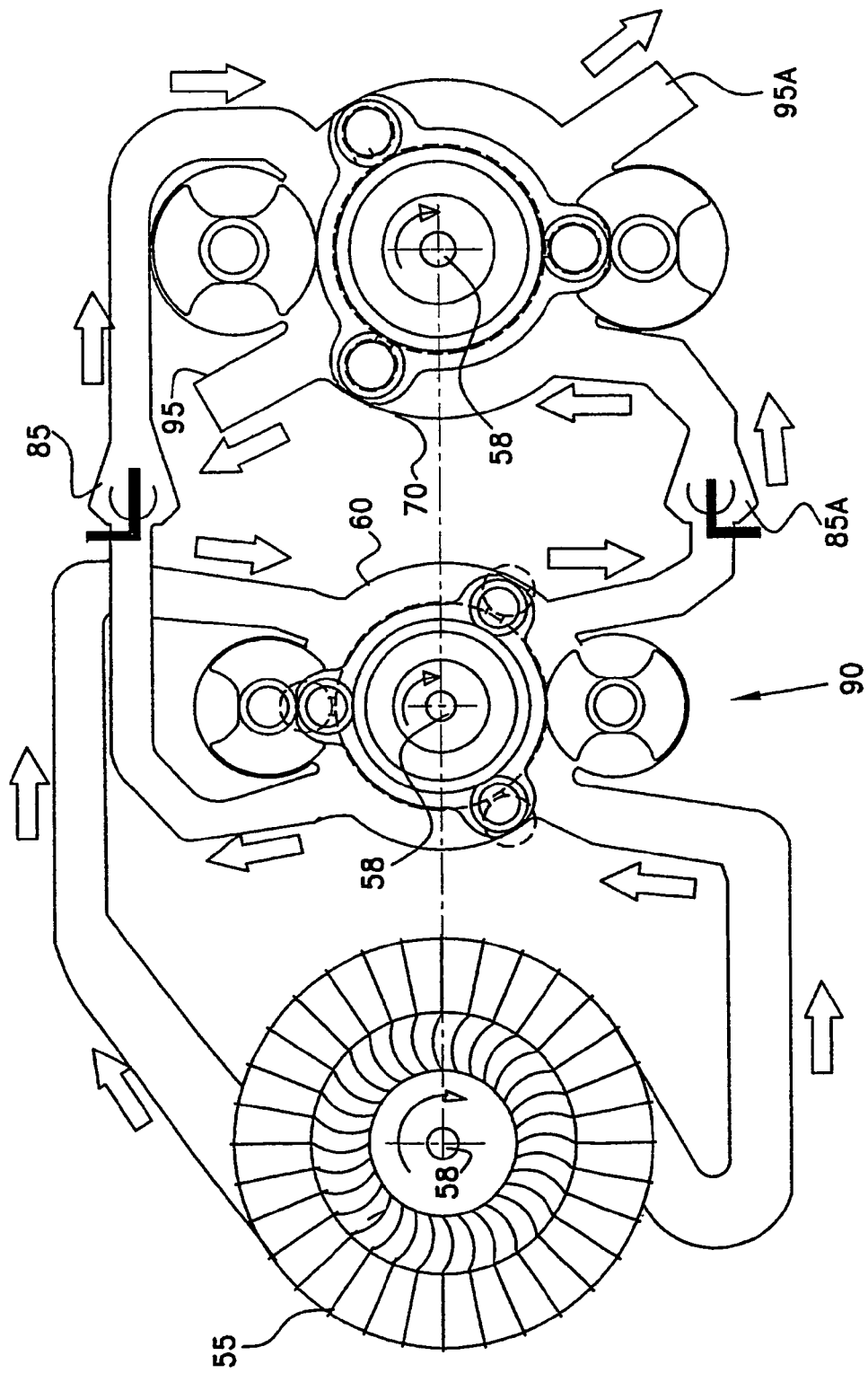
FIG. 4 is a flow diagram of an engine system which does not drive a turbine.

As shown in FIG. 4, an engine system 90 may be without a turbine, and the pressure of the fluid between transfer unit 60 and expansion unit 70 can be utilized for driving a load connected to shaft 58. Compressor 55 forces compressed working fluid into the system, whereby it is transferred to combustors 85 and 85A, heated in accordance with the present invention, and then discharged through exhaust ports 95 and 95A.

Figure 5:
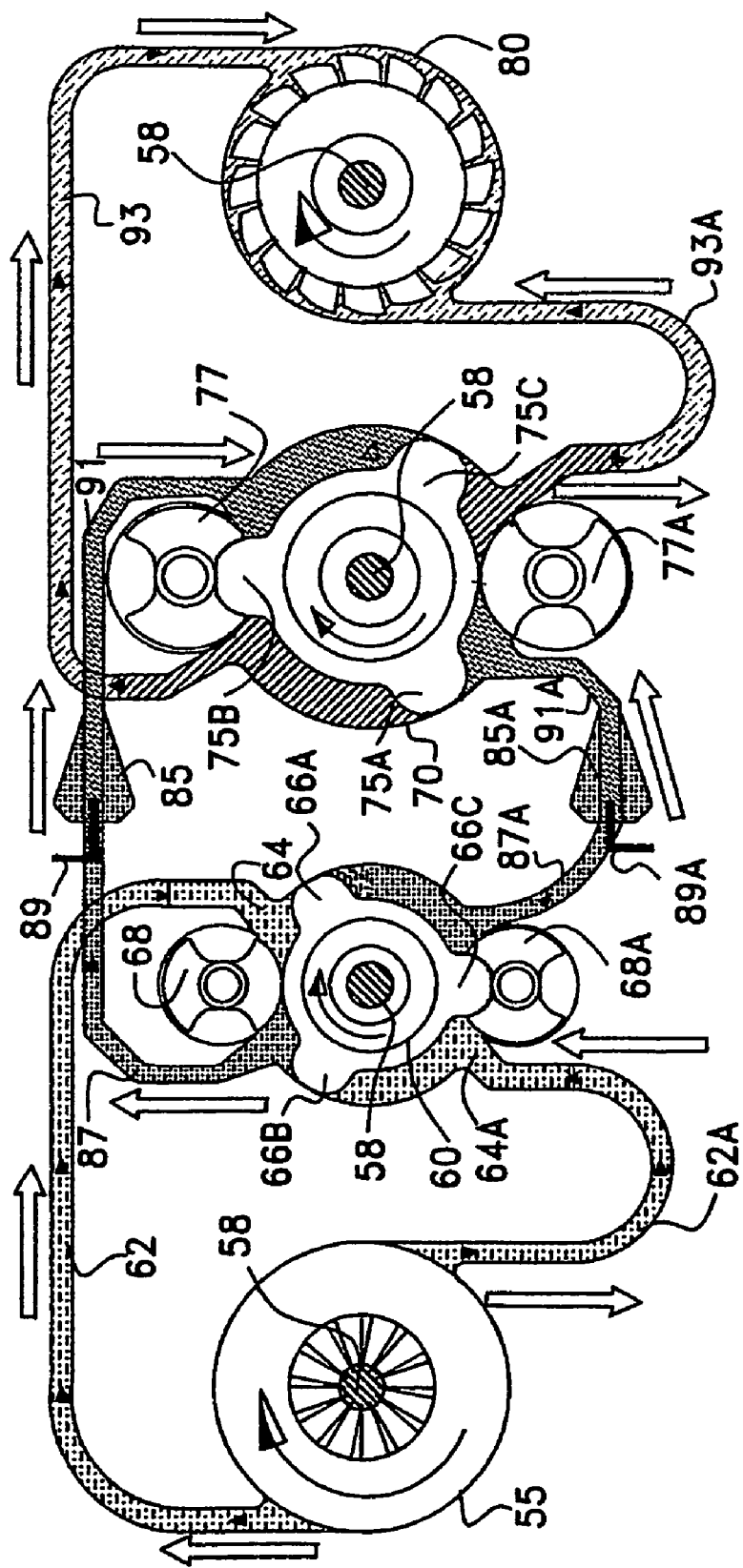
FIG. 5 is a flow diagram of an engine system according to the present invention.
Figure 5A:
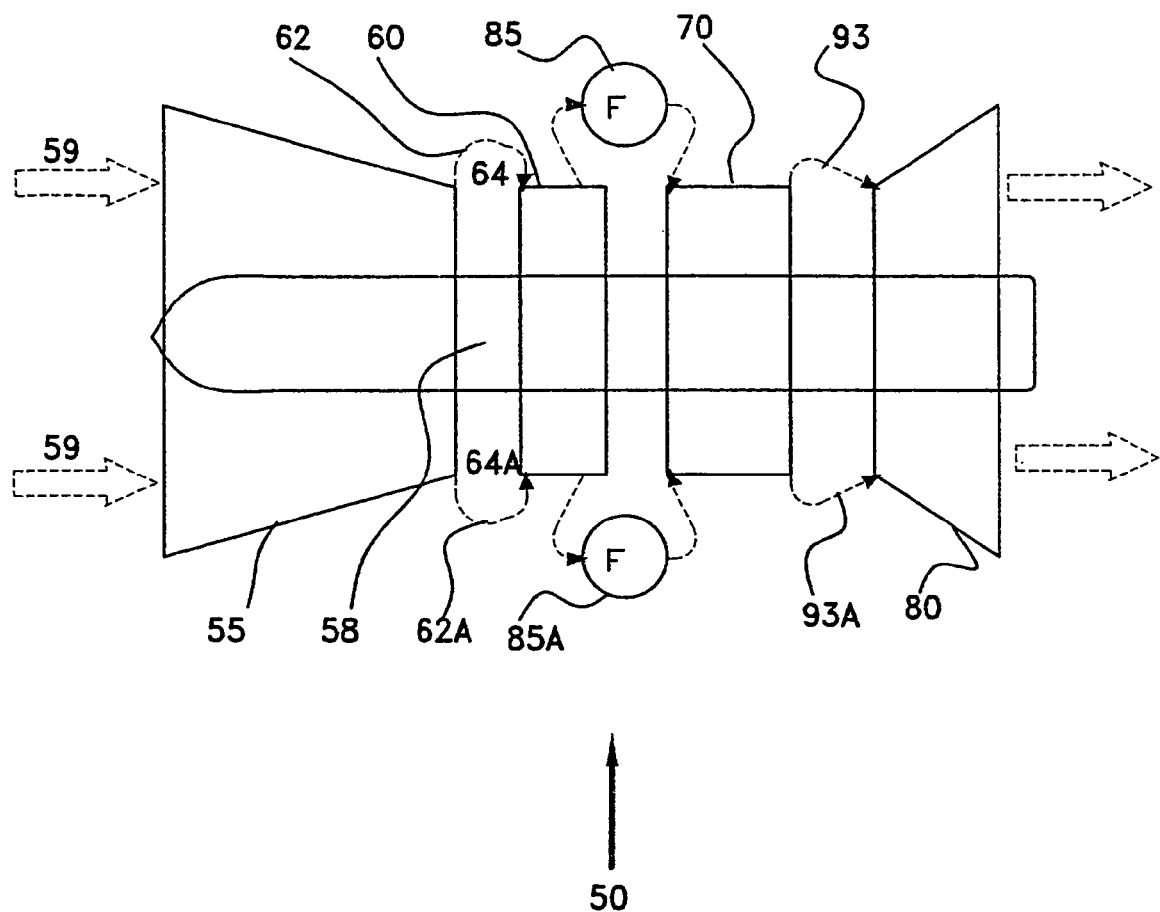
FIG. 5A is a schematic drawing of the system of FIG. 5.

FIGS. 5 and 5A schematically illustrate a gas turbine engine system based on a volumetric (rotary lobe herein) positive displacement cycle in accordance with the present invention. The system is indicated generally as 50. It comprises a compressor 55, a (first) transfer volumetric device 60, a (second) volumetric device 70, which is an expansion volumetric device, and a turbine 80 all of which devices rotate about a common shaft 58. In FIG. 5A the system is shown in schematic side view, while in FIG. 5 the said devices are shown in schematic cross-section as laterally displaced from one another while in fact they are aligned along a common longitudinal axis. Working fluid 59, after being compressed by compressor 55, flows through conduits 62 and 62A and is admitted to transfer volumetric device 60 via ports 64 and 64A, respectively.

In this embodiment transfer volumetric device 60 is provided with three lobes 66. It will be appreciated that any number of lobes may be employed. In the position of said device shown in FIG. 5, an inlet chamber is defined between casing 63, lobe 66B and buffer 68A. During rotation lobe 66C is passing buffer 68A and then maximum volume of the chamber is defined between casing 63 and lobes 66B and 66C. On continuation of clockwise rotation lobe 66B is passing buffer 68 and said chamber become an outlet chamber while it's volume is diminishing between lobe 66C and buffer 68 urging the fluid into combustor 85 through conduit 87. The same process is taking place at the other half of the same device. The different in lobe area (and as a result, in volume) between the expansion volumetric device and the transfer volumetric device, when under pressure generates moment about shaft 58 causing it to rotate (clockwise). As said shaft rotates, said inlet chambers are increased and said outlet chambers are reduced. The content of said outlet chambers is fed to combustors 85 and 85A. Said content has the volume that is referred herein as the "controlled volume". Concurrently and gradually through a rotation of shaft 58 by 180° (generally, a number of degrees equal to 360 divided by the number of buffers), in accordance with the description hereinabove, it is understood that every lobe that is passing through a buffer is forming a new inlet chamber behind it and defining an outlet chamber ahead of it.

Whenever an inlet chamber is connected by a feed conduit to the compressor and an outlet chamber is concurrently connected by a discharge conduit to a combustor, communication between the feed conduit and the discharge conduit must be prevented. This is obtained by providing rotary buffers 68 and 68A which have seats so shaped as to be engaged by any one of the lobes 66 to form a seal between conduits 62 and 87 and between conduits 62A and 87A, respectively. The combination of a buffer and a lobe, therefore, acts as a valve. Each rotary valve, together with the lobe that follows it in the direction of rotation of the volumetric transfer unit 60, demarcates a controlled volume of fluid through which work is obtainable in the engine system, and additionally urges said controlled volume to combustors 85 and 85A. In the condition shown in FIG. 5, rotary buffer 68A is engaged by lobe 66C. As device 60 continues to rotate in a clockwise direction, lobe 66A engages rotary buffer 68A. During this stage, compressed working fluid is discharged in bursts to combustors 85 and 85A via conduits 87 and 87A respectively, and another charge of working fluid is concurrently admitted to the transfer unit 60.

The combustors 85 and 85A comprise injectors 89 and 89A respectively. Fuel is injected into the compressed working fluid by means of injectors 89 and 89A, so that the resulting combustible mixture is ignited and burned in a steady state, thereby raising the pressure and temperature of the working fluid. The combustion gases constitute a heated working fluid. They are discharged to expansion volumetric device 70 via conduits 91 and 91A.

Expansion volumetric device 70 is structured like transfer volumetric device 60 except for its scale. It comprises a rotor with three lobes; 75A, 75B and 75C and rotary buffers; 77 and 77A. In the condition shown in FIG. 5, an expansion chamber is defined between buffer 77A and lobe 75A and an outlet chamber is defined between lobe 75A and buffer 77 in one sector of 180° of the expansion unit. A second expansion chamber is defined between buffer 77 and lobe 75C and an outlet chamber is defined between lobe 75C and buffer 77A in the other sector of 180° of the expansion unit. The third lobe 75B is crossing the rotary buffer 77 through a matching dent in order to perform the same operation as lobe 75A and lobe 75C in a sequence. In the structure shown in FIGS. 3, 4, 6B and 5 the volumetric device (transfer and expansion) is performing six complete cycles during each revolution of 360°. In the structure shown in FIG. 5D the volumetric device is performing twelve complete cycles during each revolution of 360°. In FIG. 7, a Wankel system volumetric device is performing six complete cycles of the rotors during each revolution of 360°, but the main shaft (which is directly connected to the compressor fan) is rotating three times faster.

Since the pressure during the expansion cycle build up continually, the remaining pressure at the end of each expansion sector is relatively high. This pressure is conducted to turbine 80 via conduits 93 and 93A in order to use its kinetic energy in the turbine.

Figure 5B:
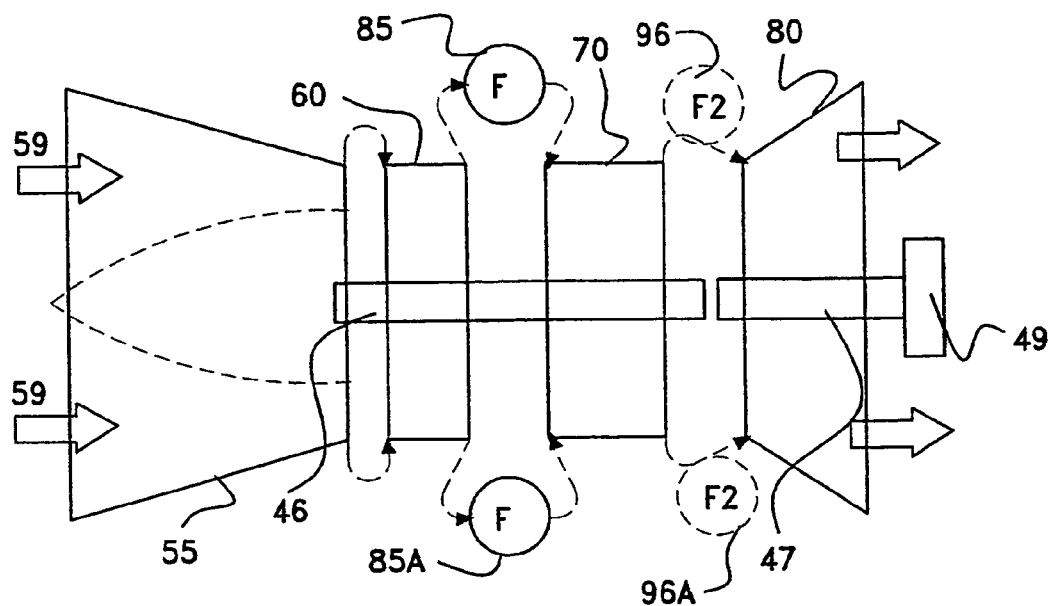
FIG. 5B is a schematic drawing of a similar engine system with the addition of secondary burners and a secondary shaft.

In FIG. 5B an engine configuration comprising two independent shafts is illustrated. Compressor 55 and volumetric devices 60 and 70 rotate about shaft 46, while turbine 80 rotates about shaft 47. As a result turbine 80 rotates at a speed independent of the speed of expansion volumetric device 70, according to an external load connected to coupling 49. Shaft 47 may drive for example a transmission system (not shown). Optionally, the exhaust from expansion unit 70 may be reheated by secondary combustors 96 and 96A before introduction to turbine 80 in order to increase the engine output. After expansion within expansion volumetric device 70, the burned combustion gases still contain a sufficient amount of oxygen to warrant the use of secondary combustors.

Figure 5C:
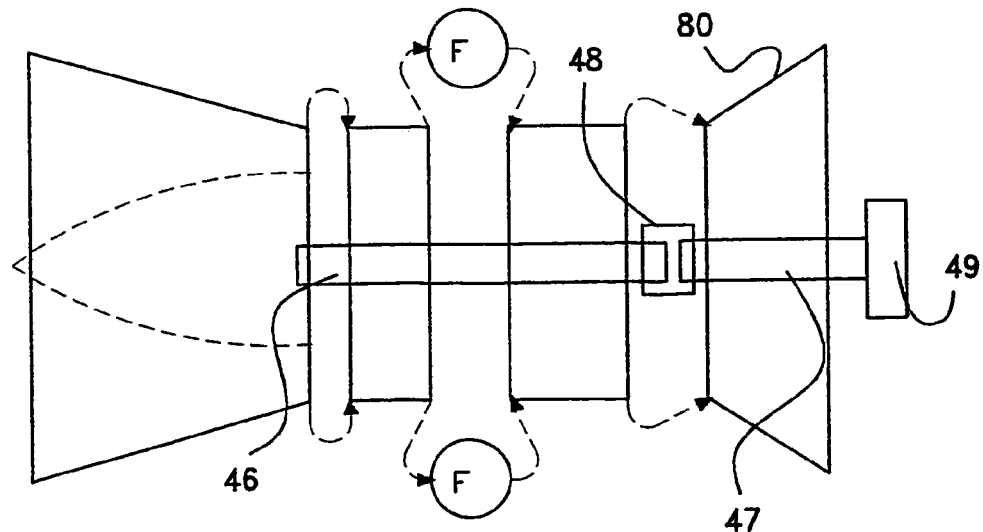
FIG. 5C illustrates the addition of a one-way clutch.

If so desired, one-way clutch 48 as illustrated in FIG. 5C may be used to further increase the flexibility of the engine configuration. When turbine 80 is under a heavy load at coupling 49 and the speed of shaft 47 is lowered to substantially that of shaft 46, one-way clutch 48 is engaged and the power performed by shaft 47 is added the power take of shaft 46. Upon reduction of the load connected to coupling 49, the speed of shaft 47 can increase to a value much higher than shaft 46 and one-way clutch 48 is disengaged from shaft 46, to allow the two shafts to rotate at different speeds.

Figure 5D:
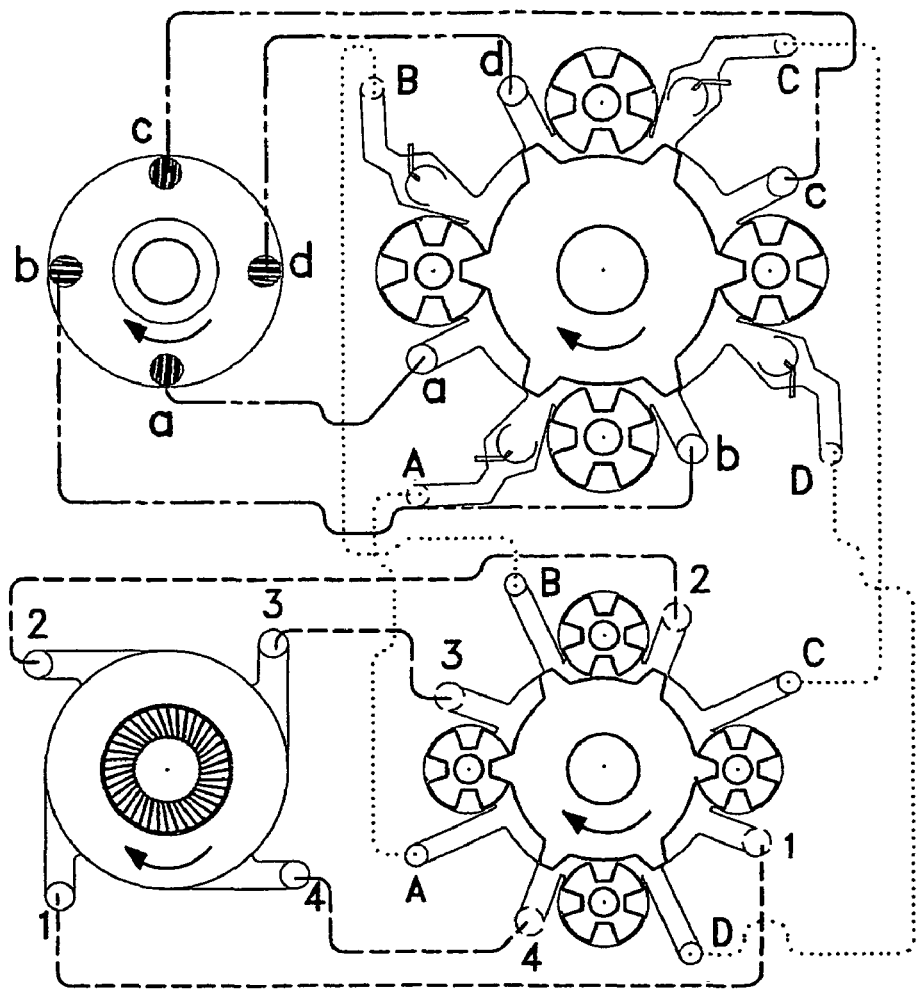
FIG. 5D demonstrates the capacity of constructing a volumetric system like that of FIG. 5 and other embodiments of the invented system, with multiple buffered sectors (four in FIG. 5D) in accordance with any specific design.

FIG. 5D schematically illustrates an engine system which differs from that illustrated in FIG. 5 only in that it comprises four, instead of two, buffered sectors in each volumetric device. FIG. 5D is therefore self-explanatory. It will be understood that different numbers of buffered sectors could be provided in such engine systems, and four sectors are known in FIG. 5D only by way of example.

Figure 6A:
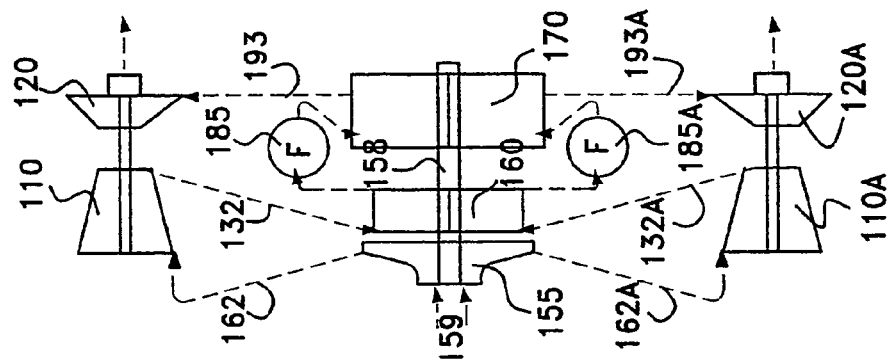
FIGS. 6A and 6B are schematic and flow diagrams, respectively, of an engine system which incorporates a turbocharger, showing the operation of a rotary lobe positive displacement cycle.
Figure 6B:
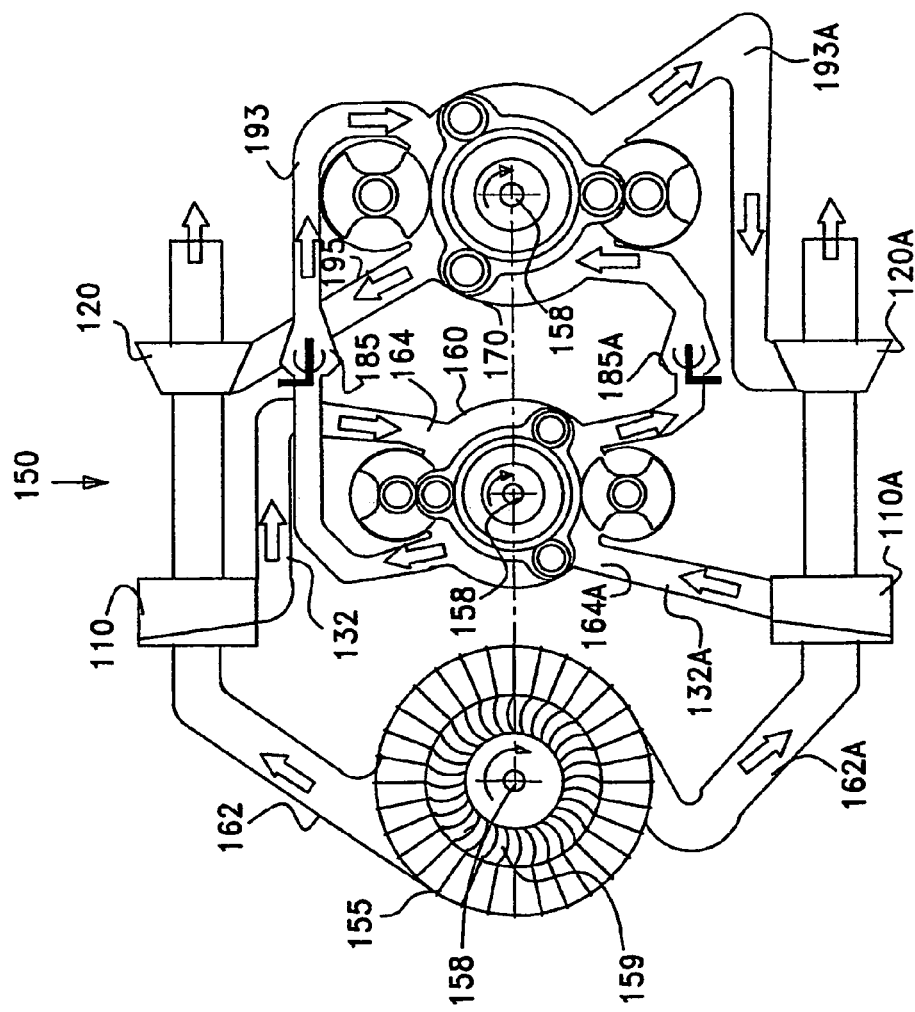
Figure 7:
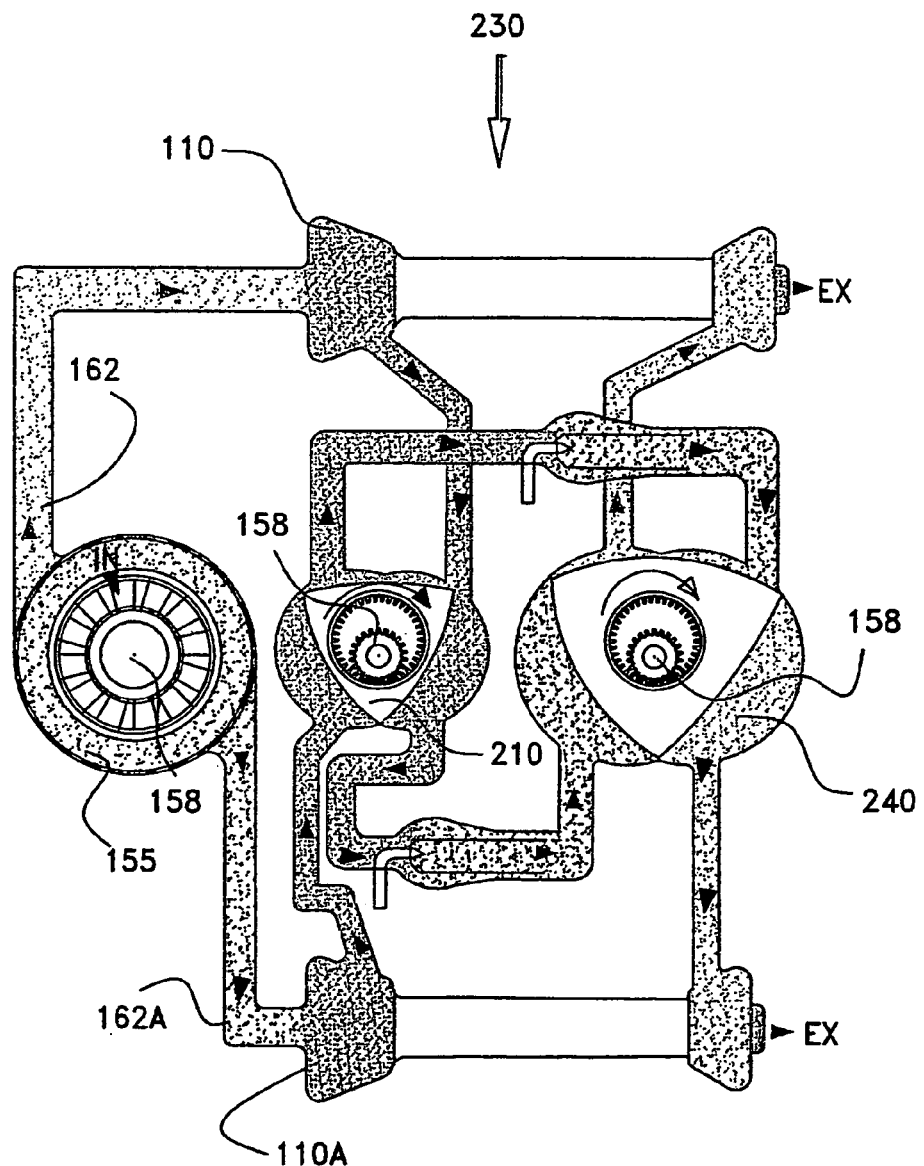
FIG. 7 is a flow diagram of an engine system which incorporates a turbocharger, showing the operation of a Wankel-based positive displacement system.

Another preferred embodiment of the present invention comprising a turbocharged engine system generally indicated by 150 is illustrated in FIGS. 6A and 6B. Intake air 159 is compressed in two stages, by compressor 155 coaxial with volumetric transfer unit 160 and expansion volumetric unit 170 and by turbocompressors 110 and 110A fed with compressed air from compressor 155 through conduits 162 and 162A, respectively. Turbocharged air flows through conduits 132 and 132A and is admitted to transfer unit 160 at entry ports 164 and 164A, respectively, with such an increased pressure that more fuel may be burned in combustors 185 and 185A, respectively, and that engine system 150 may generate more power at shaft 158. The exhaust from expansion unit 170 flows through conduits 193 and 193A and provides the motive force, by means of the kinetic energy of the combustion gases discharged from expansion unit 170 to rotate turbines 120 and 120A. Turbines 120 and 120A in turn drive turbocompressors 110 and 110A, respectively, and provide more power at the corresponding output shaft 125 and 125A, respectively.

The present invention may be performed by means of other positive displacement devices. A system generally designated by 230 is illustrated in FIG. 7, in which the positive displacement cycle is based on a Wankel mechanism, in which a triangular rotor rotates on an eccentric shaft inside an epitrochoidal housing. Intake air is compressed in two stages, namely by compressor 155, which is coaxial with volumetric transfer unit 210 and with expansion volumetric unit 240, which has a larger inner volume than that of the first volumetric transfer unit 210, and by turbocompressors 110 and 110A whose inlet is compressed air flowing from compressor 155 through conduits 162 and 162A, respectively. As the triangular rotor of a volumetric unit rotates, each controlled volume of fluid which is sequentially admitted into the corresponding volumetric unit is captured by two adjacent apexes of the triangular rotors. Therefore transfer unit 210 can deliver turbocharged air to the combustors and expansion unit 240 allows for the expansion of combustion gases so that a desired amount of work is obtainable at common shaft 158, in accordance with the present invention.

Figure 8:
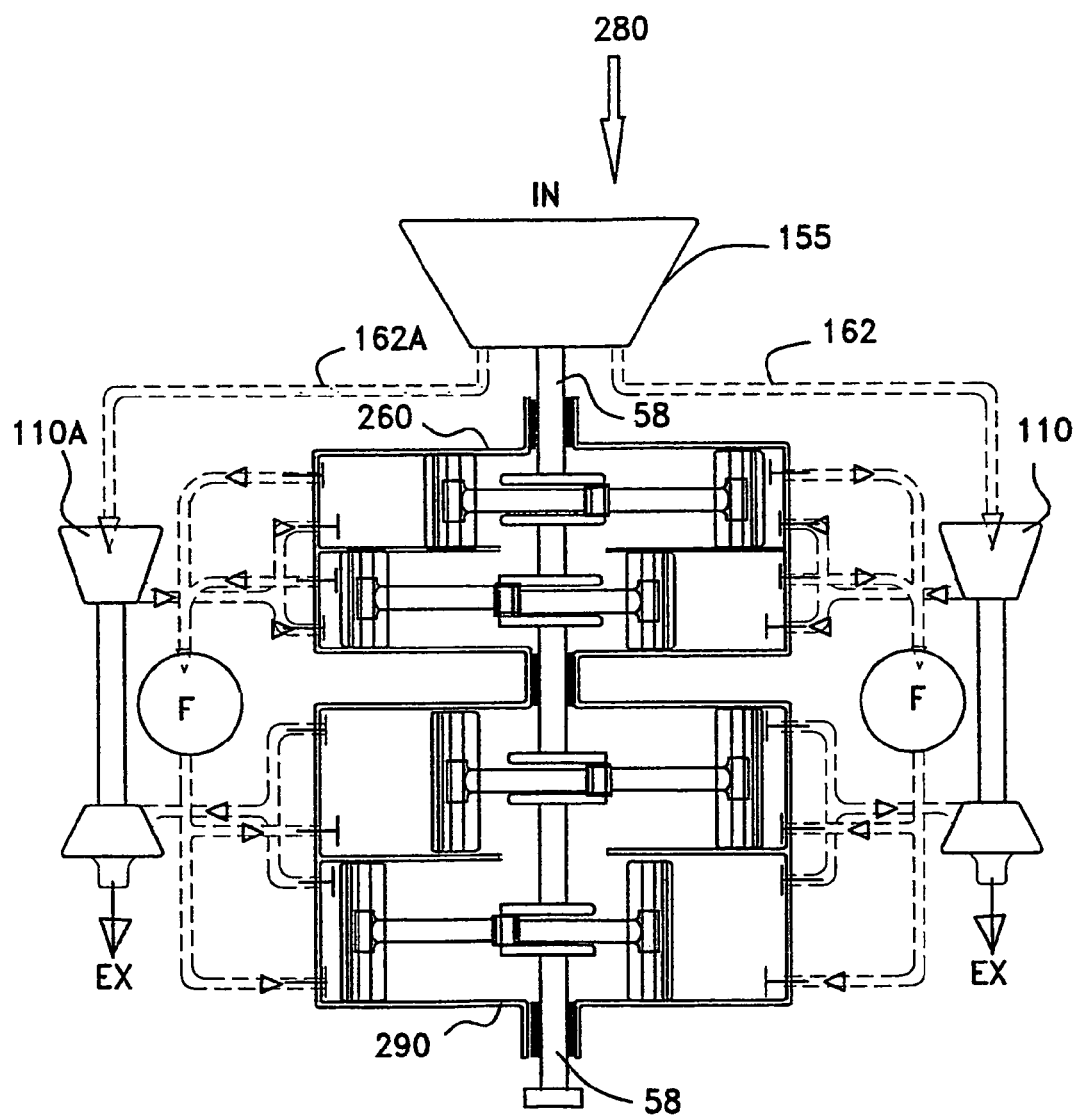
FIG. 8 is a flow diagram of an engine system which incorporates a turbocharger, showing the operation of a reciprocating piston positive displacement system.

Another volumetric system generally designated by 280 in accordance with the present invention is illustrated in FIG. 8, in which the positive displacement cycle is based on a reciprocating piston system. In FIG. 8, like with any other sort of adoptable volumetric mechanism of the present invention, a wide variety of embodiments with different peripheral systems in accordance. The following description of FIG. 8 is just one of numbered feasibilities.

Intake air is compressed in two stages, namely by compressor 155 coaxial with volumetric transfer unit 260 and expansion volumetric unit 290 and by turbocompressors 110 and 110A whose inlet is compressed air flowing from compressor 155 through conduits 162 and 162A, respectively. Each controlled volume of turbocharged working fluid is sequentially fed to the first transfer volumetric unit and is sequentially urged from the transfer unit 260 to the expansion volumetric unit 290 by a predetermined timing of valve sets.

Figure 9:
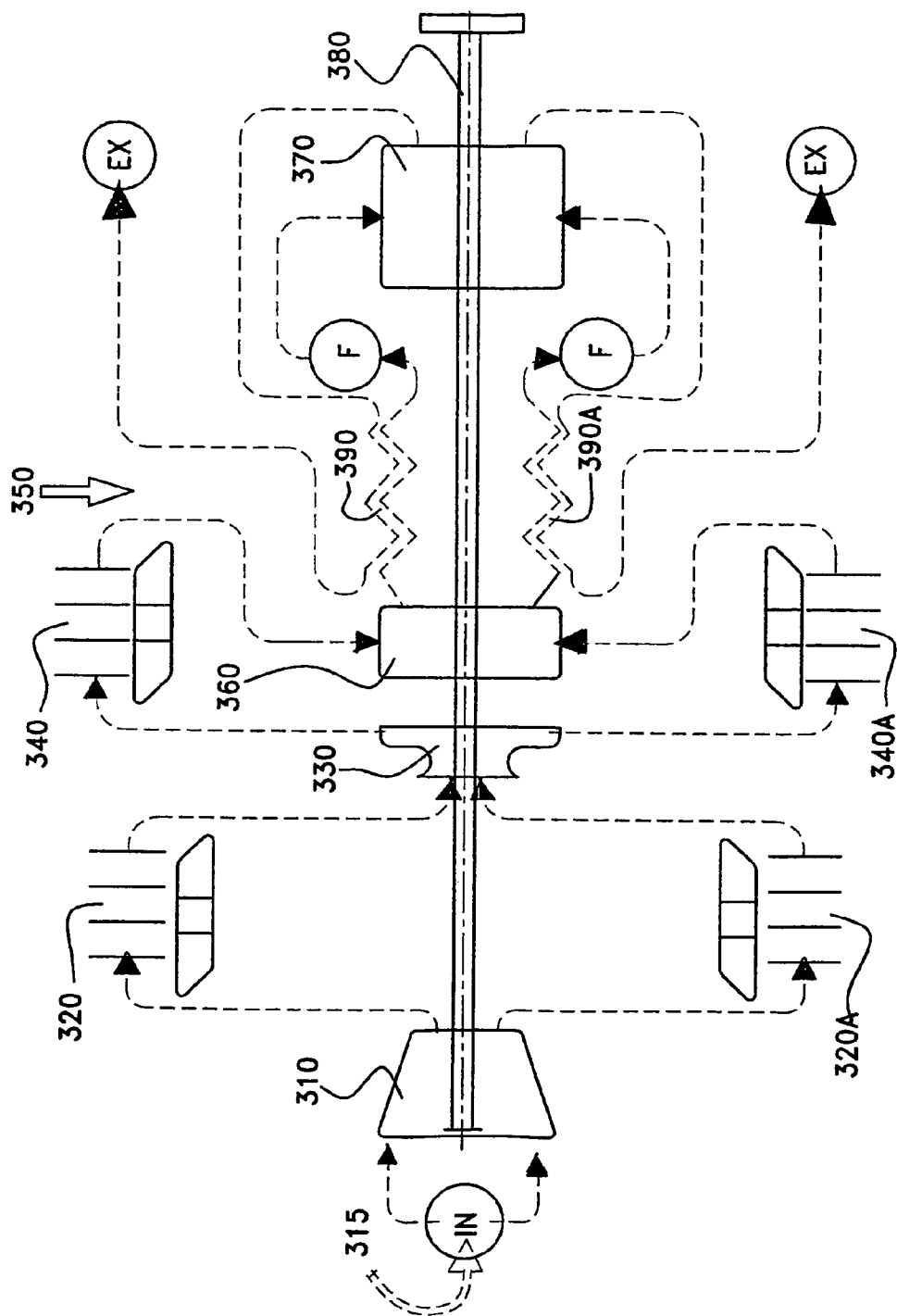
FIG. 9 is a flow diagram of an engine system which incorporates intercoolers and heat exchangers.

FIG. 9 is an explanatory system which describes the adaptation feasibility of common systems of prior art by the present invented system in order to achieve higher performance and efficiency. An engine is generally indicated by 350, according to another preferred embodiment of the present invention illustrated in FIG. 9, showing the high adaptability of the present invention for common peripheral systems in order to improve efficiency and output that can be further increased by the employment of intercoolers, in order to cool the temperature of compressed working fluid and thereby to provide fluid at higher density to the volumetric devices. Axial compressor 310 forces ambient air 315 to first stage intercoolers 320 and 320A, after which the compressed and cooled air is additionally compressed at radial compressor 330 and second stage intercoolers 340 and 340A, respectively. A higher fluid density therefore results between expansion volumetric unit 370 and transfer volumetric unit 360. Heat exchangers 390 and 390A, are using exhaust gases temperature to preheat the working fluid at entrance to the combustors in order to achieve higher efficiency and output.

With implementation of the various applications described hereinabove, an engine of the present invention may be adapted for use with land motor vehicle of all sorts, which requires a wide variation output in load and rotational speed, with an immediate response to a change in one of the operational parameters of the system. Due to the unique configuration, an engine in accordance with the present invention is advantageously suitable for the burning of any existing engine fuel.

Figure 10A:
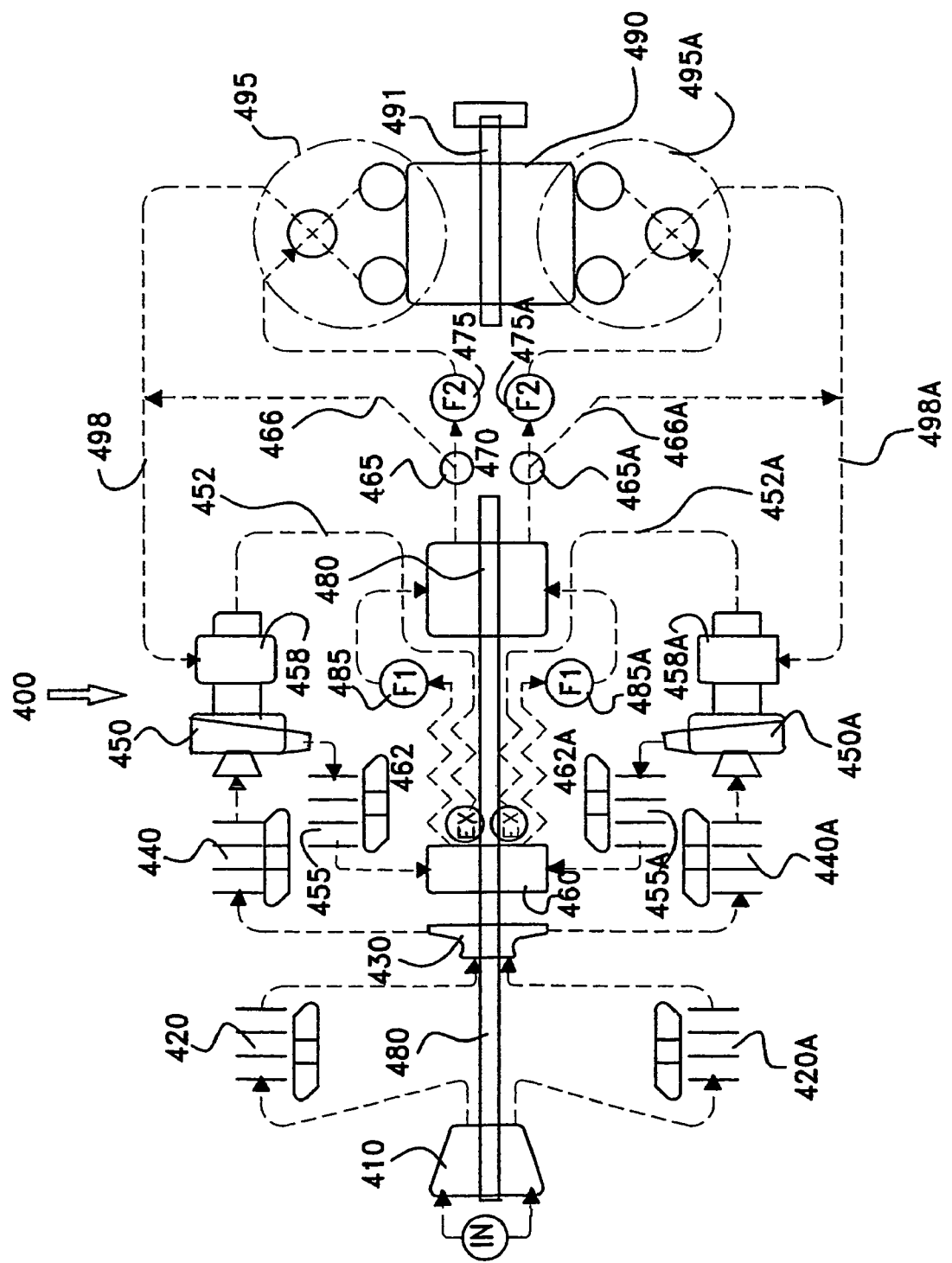

In one preferred embodiment of the invention, engine 400 which is suitable for operation with motor vehicles is illustrated in FIGS. 10A and 10B. Engine 400 comprises three stages of intercoolers: first stage intercoolers 420 and 420A for cooling compressed ambient air from axial compressor 410, second stage intercoolers 440 and 440A for cooling compressed air from radial compressor 430 which compresses the discharge from the first stage intercoolers, and third stage intercoolers 455 and 455A for cooling compressed air from turbocompressors 450 and 450A, respectively, which receive air from a corresponding second stage intercooler. The discharge from the third stage intercoolers is introduced to transfer unit 460. The discharge from transfer unit 460 is heated by heat exchangers 462 and 462A, which utilize the exhaust from turbocompressors 450 and 450A, respectively, as indicated by conduits 452 and 452A, respectively, before introduction into primary combustors 485 and 485A, respectively, so as to increase the available energy level of the working fluid. The fluid heated by the primary combustors flows to expansion unit 470 and performs work at main shaft 480.

The flexibility and efficiency of engine 400 is further increased by providing a third volumetric device 490, which rotates about an independent shaft 491 and transmits an additional amount of power. The exhaust from expansion unit 470 is heated by secondary combustors 475 and 475A, so as to function as a pressure generator for volumetric device 490 by utilizing the oxygen content of the unburned exhaust. The heated exhaust from expansion unit 470 is introduced to selector valves 495 and 495A. As seen more clearly in FIG. 10C, selector valve 495, for example, is actuatable to direct the flow of the expansion unit outlet into inlet port 496 resulting in clockwise rotation of shaft 491 or into outlet port 497 resulting in counterclockwise rotation of shaft 491. The exhaust from volumetric device 490 is then discharged by lines 498 and 498A, respectively, to the turbines of turbochargers 458 and 458A, respectively, which drive a corresponding turbocompressor. If so desired, the exhaust from volumetric device 490 may be directed to a heat exchanger, or to any other suitable application. Any of the hereinabove peripheral units as secondary combustors, intercoolers and heat exchanger can be in use or avoided according to any specific design.

Volumetric device 490 develops power by means of any of the positive displacement cycles described hereinabove. Since independent shaft 491 is coupled to a load, volumetric device serves as a torque converter, wherein the torque applied by shaft 491 is variable, depending on the load and on the pressure between expansion unit 470 and volumetric device 490. The volume of device 490 is advantageously relatively small if shaft 491 is desired to be rotated at a relatively high velocity and low torque. Alternatively, the volume of device 490 is chosen to be larger if shaft 491 is desired to be rotated at a relatively low velocity and high torque. A locking mechanism is situated between main shaft 480 and secondary shaft 191 in order to enable unification of the two shafts into one for certain utilizations. Bypass valves 465 and 465A are functioning as engagement/disengagement device, enabling to keep the engine running and idling while third volumetric unit (torque converter) is disengaged.

Engine 400 is adapted to provide a flexible and gradual transmission by employing a plurality of volumetric devices, as illustrated in FIG. 10C, disposed at the outlet of secondary combustors 475 and 475A, with a number of selector valves in use to select through which combination of devices working fluid heated by secondary combustors will flow. Working fluid heated by secondary combustors flows in parallel conduits into a corresponding volumetric device, and a separate selector valve in communication with each conduit controls the flow through the corresponding conduit. Each of these volumetric devices are coaxial and the net power output from independent shaft 491 is the sum of the power output from each individual volumetric device. Accordingly, the engine produces a maximum amount of torque when the discharge from the secondary combustors is directed to all the volumetric devices in parallel. If an operator desires to smoothly lower the torque and increase the speed of shaft 491, one selector valve is actuated to prevent the flow to the corresponding individual volumetric device, the same amount of fluid is then flowing through one less device, causing augmentation of velocity on the account of torque diminution.

Similarly any number of volumetric devices may be by passed in order to achieve a desired speed or torque. The direction of independent shaft 491 is changed by actuating the selector valve of each volumetric device in unison. Preferably the selector valves are automatically actuated upon input of an operator.

Figure 10D:
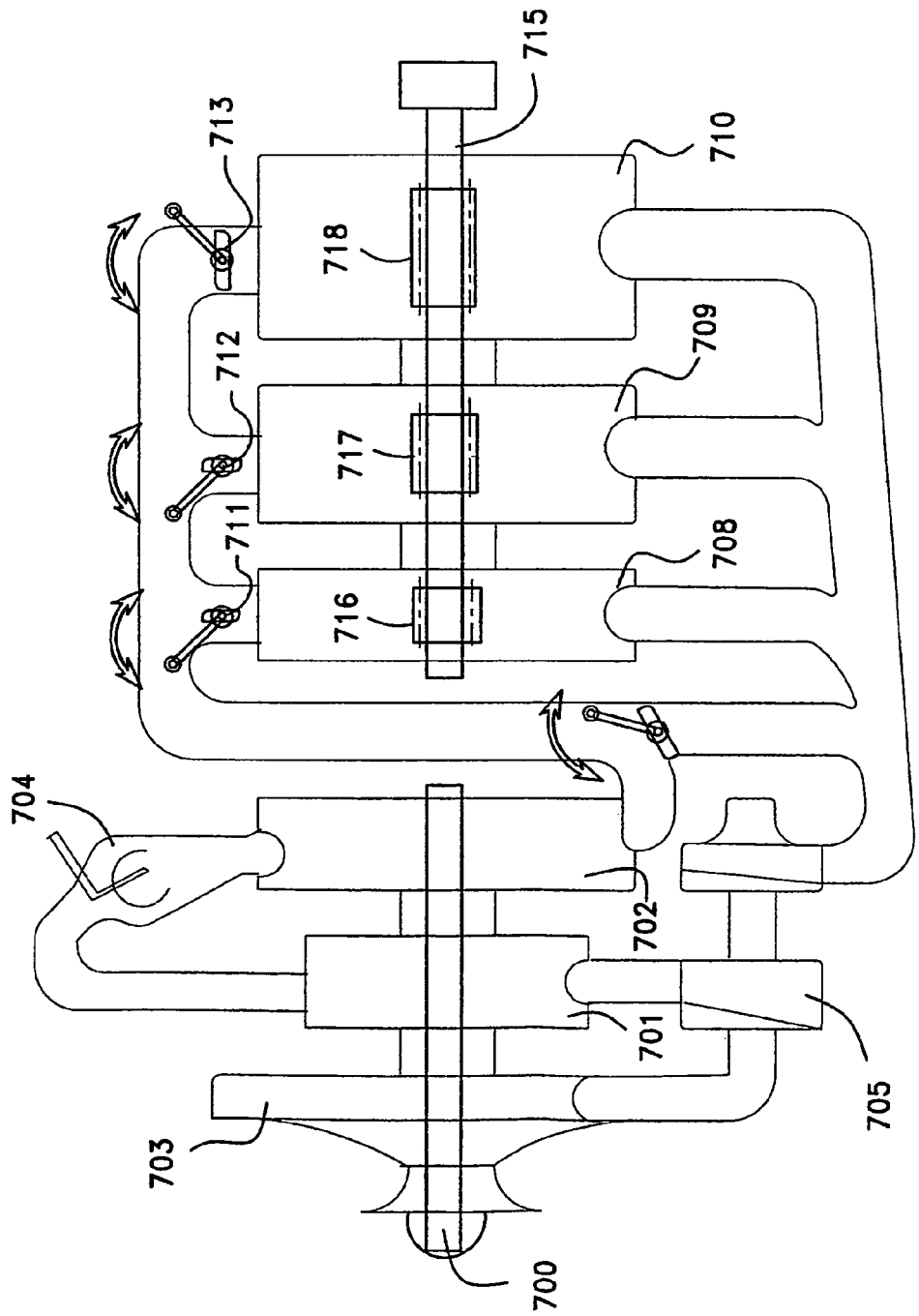
FIG. 10D is a schematic drawing of a motor vehicle transmission system (torque converter) comprising a plurality of coaxial volumetric devices rotatable about an independent shaft and their control system.

FIG. 10D schematically illustrates an engine, comprising, in addition to volumetric devices 701 and 702, such as have been illustrated in preceding embodiments, three additional volumetric devices 708, 709 and 710 that serve as torque converters. Numeral 700 indicates the shaft to which volumetric devices 701 and 702 are keyed. 703 is a compressor, 704 is a combustor and 705 is a turbocharger. Said additional volumetric devices 708, 709 and 710 can be activated or disactivated by opening or closing valves 711, 712 and 713 respectively. While volumetric devices 708, 709 and 710 are mounted on shaft 715, they may be mounted through one-way bearings 716, 717 and 718 respectively, so that if they are deactivated, they do not rotate with shaft 715. The said additional volumetric devices vary the torque and the speed of rotation of the engine in two ways: one, by activating appropriate combination of volumetric transmission devices in general accordance with load and speed and secondly by the variation of the pressure buildup in the said volumetric activated units based on the compressible nature of the fluid (usually air) in order to cope with load and speed variations within a chosen combination of transmission volumetric units.

Figure 11:
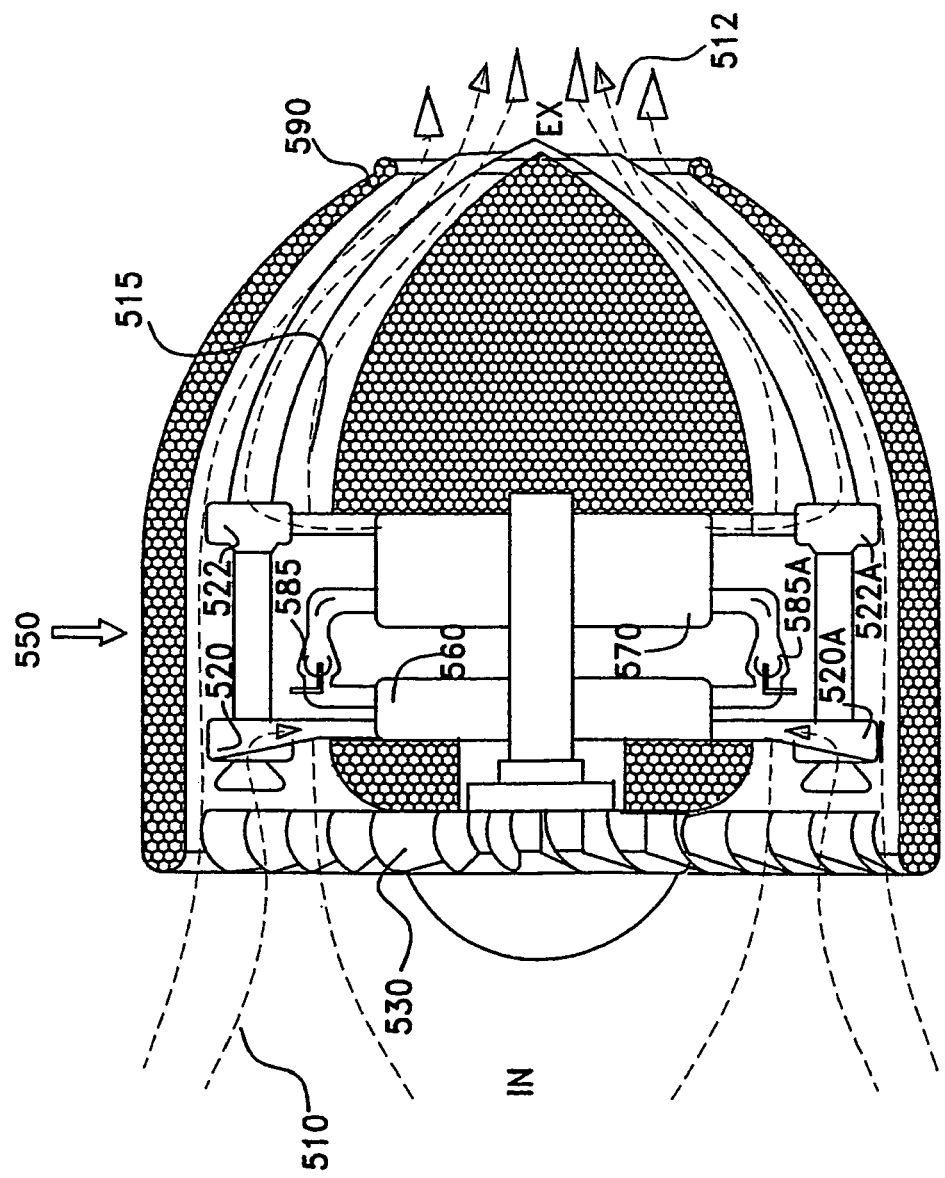
FIG. 11 is a schematic drawing of an engine system suitable for a turbofan.

Another preferred embodiment of the present invention is illustrated in FIG. 11, for use as a turbofan engine generally designated as 550. Atmospheric air 510 is admitted to turbocompressors 520 and 520A under normal pressure produced by the fan 530, and is compressed furthermore before delivery to transfer unit 560. Transfer unit 560 discharges the compressed air to combustors 585 and 585A, from which combustion gases flow to expansion volumetric device 570. As the combustion gases expand, a motive force is produced due to the pressure between expansion volumetric device 570 and transfer volumetric device 560, causing shaft 558 to rotate and to drive fan 530. Fan 530 generates a crossfan streamline 515 which flows through duct 590 and results in thrust. The exhaust from device 570 is delivered to turbines 522 and 522A of the turbochargers, in order to drive a corresponding turbocompressor. The exhaust from turbines 522 and 522A is discharged to the atmosphere and provides additional thrust.

Figure 12:
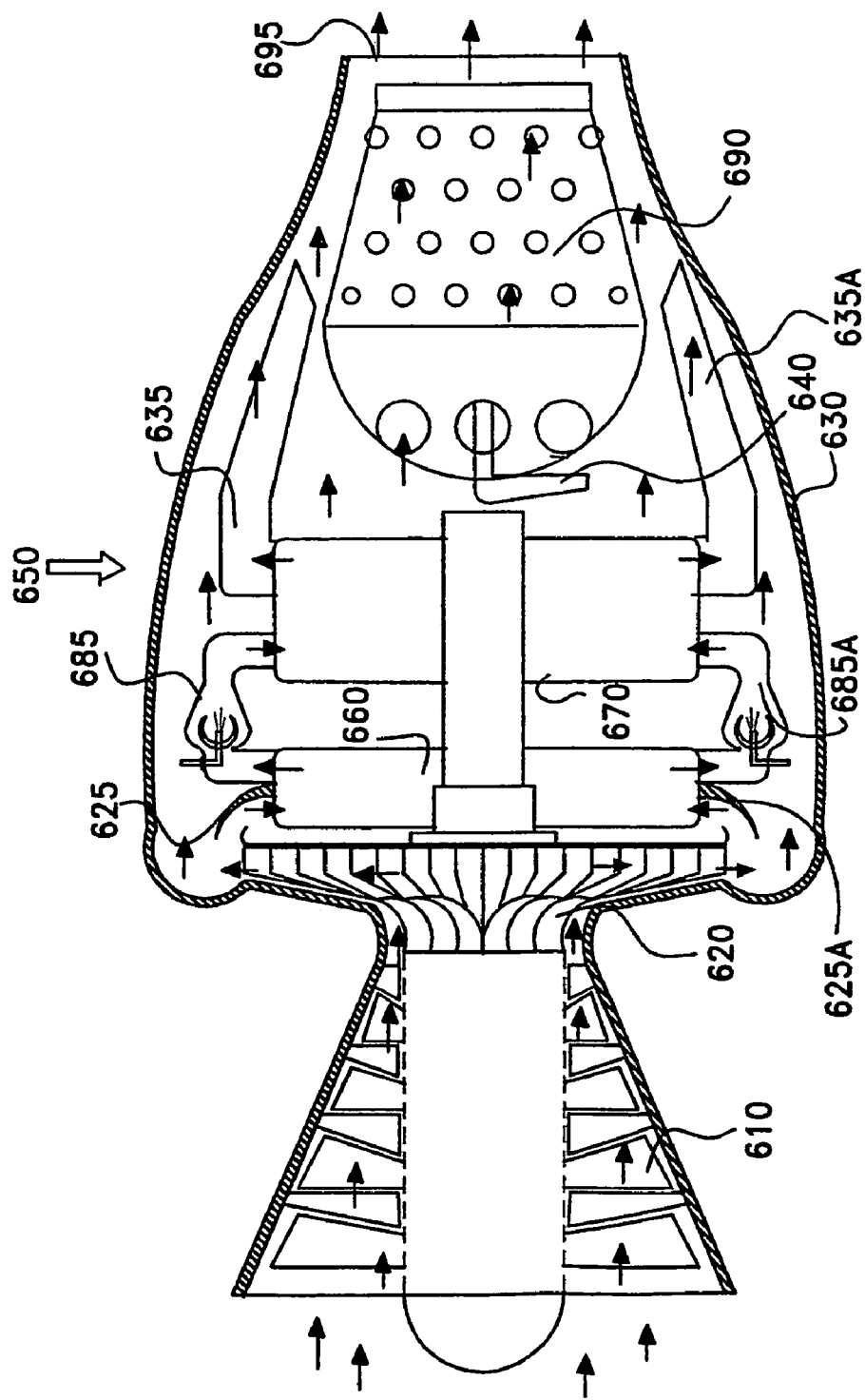
FIG. 12 is a schematic drawing of an engine system suitable for a turbojet.

FIG. 12 illustrates another preferred embodiment in which a turbojet engine system indicated generally by 650 comprises axial compressor 610, radial compressor 620, transfer volumetric device 660, engine combustors 685 and 685A, expansion volumetric device 670 and main combustor 690. The majority of the aircraft thrust is provided by main combustor 690. Compressed air from compressors 610 and 620 introduced to main combustor 690 via apertures 675 is mixed with fuel injected by injector 640, and the combustible mixture is burned to produce a powerful jet stream. Compressors 610 and 620 are driven by shaft 658, as a result of the torque imparted thereto by device 670. The remainder of the compressed air not admitted to main combustor 690 is cooling the main combustor and its envelope and together with the exhaust from expansion unit 670 provide auxiliary thrust which streams to the rearward side of the engine, through outlet nozzle 695.

It will be appreciated that an aircraft engine corresponding to the embodiment of FIG. 11 or FIG. 12 drives the compressors by means of energy, due to the pressure between the volumetric device, and therefore can operate at high efficiency despite a wide variation in speed and load. Consequently such aircraft engines are suitable for applications that heretofore have been unfeasible.

To mass produce engines according to the present invention in a cost effective manner, one may produce the engines of the present invention in a modular fashion.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An engine system, comprising:
    a) a compressor or a turbocompressor for compressing a fluid;
    b) a first transfer positive displacement device for sequentially transferring controlled volumes of said compressed fluid;
    c) an intake conduit extending from said compressor or turbocompressor to said first positive displacement device;
    d) at least one second positive displacement device geometrically larger in volume than said first positive displacement device;
    e) a corresponding valveless passageway extending from said first positive displacement device to said at least one second positive displacement device; and
    f) a combustor for providing continuous combustion, said combustor being disposed within said corresponding passageway, such that each of said second positive displacement devices receives heated fluid from a corresponding combustor,
    wherein said first transfer positive displacement device is continuously sealed to prevent fluid communication between said intake conduit and said corresponding passageway and to prevent backflow of said heated fluid,
    wherein, during continuous flow of said fluid from said first positive displacement device to each of said at least one second positive displacement devices, work is performed in response to expansion of said heated fluid within said at least one second positive displacement device such that said engine system is not stallable when the pressure of said heated fluid within said corresponding passageway is greater than the pressure of said compressed fluid within said intake conduit.

2. The engine system according to claim 1, wherein a turbine of the turbocompressor is driven by the fluid discharged from each of the second positive displacement devices.

3. The engine system according to claim 1, further comprising one or more: corresponding independent flow paths through which the compressed fluid flows, each flow path beginning with a separate intake conduit leading to said first positive displacement device and ending with a separate discharge conduit coming from an outlet of the corresponding second positive displacement device, wherein the corresponding second positive volumetric device receives heated fluid from the corresponding combustor via the corresponding separate flow path.

4. The engine system according to claim 3, further comprising a common shaft supporting the first and the at least one second positive displacement devices for rotation, for synchronizing the rotation of the first and the at least one second positive displacement devices.

5. The engine system according to claim 2, wherein the discharge of a second positive displacement device is the inlet of the turbine.

6. The engine system according to claim 1, wherein each combustor is fed with a fuel, which when burnt causes the controlled volumes of fluid to be heated and expanded.

7. The engine system according to claim 3, wherein the first and at least one second positive displacement device are keyed to a common main shaft.

8. The engine system according to claim 7, wherein the compressor is keyed to the main shaft.

9. The engine system according to claim 7, further comprising a turbine keyed to the main shaft.

10. The engine system according to claim 3, wherein the compressed fluid is air.

11. The engine system according to claim 3, wherein the positive displacement cycle is effected by an apparatus selected from the group consisting of rotors provided with lobes, a Wankel mechanism, reciprocating piston systems, and a volumetric mechanism.

12. The engine system according to claim 3, further comprising at least one stage of intercoolers.

13. The engine system according to claim 3, comprising two independent shafts to one of which are keyed the first and second positive displacement devices, a load being coupled to the other shaft.

14. The engine system according to claim 13, further comprising a clutch for engaging and disengaging the two independent shafts, depending on a magnitude of the load.

15. The engine system according to claim 3, further comprising a secondary heater.

16. The engine system according to claim 12, further comprising a second compressor, wherein the at least one stage of intercoolers comprises a first stage intercooler for cooling the discharge flowing from a first compressor to said second compressor.

17. The engine system according to claim 16, further comprising a turbocompressor and a second stage intercooler for cooling the discharge flowing from the second compressor to the first positive displacement device.

18. A motor vehicle propulsion system comprising: a) an engine system including: i. a compressor or a turbocompressor for compressing a fluid; ii. a first transfer positive displacement device for sequentially transferring controlled volumes of said compressed fluid; iii. at least one second positive displacement device geometrically larger in volume than said first positive displacement device; iv. a corresponding valveless passageway extending from said first positive displacement device to said at least one second positive displacement device; and v. a primary heat source disposed within said corresponding passageway such that each of said second positive displacement devices receives heated fluid from a corresponding primary heat source, wherein said first transfer positive displacement device is continuously sealed to prevent fluid communication between an intake conduit and said corresponding passageway and to prevent backflow of said heated fluid, wherein, during continuous flow of said fluid from said first to each of said second positive displacement devices, work is performed in response to expansion of said heated fluid within said at least one second positive displacement device such that said engine system is not stallable when the pressure of said heated fluid within said corresponding passageway is greater than the pressure of said compressed fluid within said intake conduit; and vi. a first independent shaft to which said first positive displacement device and said at least one second positive displacement device are keyed, for synchronizing rotation of said first positive displacement device and said at least one second positive displacement device; b) a secondary heater for heating exhaust from said engine system; c) a third positive displacement device rotating about a second independent shaft, wherein the discharge from said at least one second positive displacement device is the working fluid of said third positive displacement device, said third positive displacement device functioning as a torque converter in response to a variable load coupled to said second independent shaft, and d) a rotational direction controller of said second independent shaft characterized by a valve means for selectively directing said discharge from said at least one second positive displacement device to a first port or to a second port of said third positive displacement device, one of said first and second ports being an inlet port and one of said first and second ports being an outlet port, depending on an instantaneous rotational direction of said second independent shaft.

19. The motor vehicle propulsion system according to claim 18, further comprising a transmission comprising:
 a) a plurality of coaxial third positive displacement devices rotatable about the second independent shaft;
 b) a common conduit through which the discharge from the at least one second positive displacement devices is flowable;
 c) a plurality of conduits extending in parallel from said common conduit to each of said plurality of third positive displacement devices, respectively;
 d) a plurality of selector valves in communication with each of said plurality of conduits, respectively, each of said plurality of selector valves controlling flow of the second positive displacement device discharge to a corresponding third positive displacement device to activate or deactivate said corresponding third positive displacement device and thereby selecting through which combination of said plurality of third positive displacement devices said second positive displacement device discharge will flow,
 wherein said motor vehicle propulsion system produces a maximum amount of torque when the second positive displacement discharge is directed to all of said plurality of third positive displacement devices in parallel, a lowered level of torque upon deactivation of at least one of said plurality of third positive displacement devices, and an increased level of torque upon activation of at least an additional one of said plurality of third positive displacement devices.

20. The motor vehicle propulsion system according to claim 18, further comprising a bypass valve operatively connected to a bypass conduit extending from an outlet of a torque converter assembly comprising one or more of the third positive displacement devices to an inlet of the turbocompressor, wherein fluid flows through said bypass conduit when said bypass conduit is open to cause said torque converter assembly to be deactivated while the engine system remains in operation and said torque converter assembly is activated when said bypass valve is closed.

21. A turbofan engine system comprising an engine system according to claim 4, wherein the turbocompressor is driven by discharge from the at least one second positive displacement device, further comprising a fan mounted on the common shaft driven by said engine system, said fan generating a crossfan streamline and a main thrust for an aircraft, exhaust from said turbocompressor being discharged to the atmosphere and providing auxiliary thrust in addition to said main thrust.

22. A turbojet engine system, comprising an engine system according to claim 7 and further comprising a main combustor,
wherein the compressor is mounted on the main shaft and is driven by the engine system,
wherein a first portion of air compressed by the compressor is fed to the first positive displacement device and a second portion of air is introduced into said main combustor for generating a gas stream providing a main thrust for an aircraft,
wherein exhaust from the at least one second positive displacement device is discharged to the atmosphere and provides auxiliary thrust in addition to said main thrust.

* * * * *